(12) United States Patent
Asano et al.

(10) Patent No.: US 7,242,651 B2
(45) Date of Patent: Jul. 10, 2007

(54) DISK REPRODUCTION DEVICE

(75) Inventors: Kenji Asano, Kakamigahara (JP); Hideaki Yano, Osaka (JP); Koichi Tada, Gifu (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 395 days.

(21) Appl. No.: 10/432,638

(22) PCT Filed: Dec. 10, 2001

(86) PCT No.: PCT/JP01/10772

§ 371 (c)(1),
(2), (4) Date: Jun. 10, 2003

(87) PCT Pub. No.: WO02/49031

PCT Pub. Date: Jun. 20, 2002

(65) Prior Publication Data

US 2004/0027947 A1   Feb. 12, 2004

(30) Foreign Application Priority Data

Dec. 11, 2000 (JP) ............... 2000-375922
Dec. 11, 2000 (JP) ............... 2000-375923

(51) Int. Cl.
*G11B 7/05* (2006.01)
*G11B 11/10* (2006.01)

(52) U.S. Cl. ............... 369/47.28; 369/59.19
(58) Field of Classification Search ............ 369/47.28, 369/47.53, 44.32, 44.41, 13.02, 53.12, 53.26, 369/53.27, 53.34, 124.14, 124.15, 47.11, 369/94, 44.27, 116, 30.23, 30.27, 44.29, 44.25, 369/59.19, 53.37, 44.35, 47.24, 47.35, 47.17, 369/59.12, 59.21, 124.02, 53.35; 360/46, 360/53

See application file for complete search history.

(56) References Cited

U.S. PATENT DOCUMENTS 5,612,939 A * 3/1997 Ueki et al. ............... 369/47.11

(Continued)

FOREIGN PATENT DOCUMENTS

JP   3-095773   4/1991

(Continued)

OTHER PUBLICATIONS

Japanese Patent Office Communication for corresponding Japanese Patent Application dated Feb. 22, 2005.

*Primary Examiner*—Andrea Wellington
*Assistant Examiner*—Kim-Kwok Chu
(74) *Attorney, Agent, or Firm*—Armstrong, Kratz, Quintos, Hanson & Brooks, LLP (57) ABSTRACT

The invention provides a disk playback device wherein a disk (1) is irradiated with a laser beam from an optical head (4) to reproduce signals from the disk, and which comprises an external synchronizing signal producing circuit (8) and a delay circuit (12) for producing a reproduction synchronizing signal providing reference timing at which a reproduced signal is detected by reading an output signal from the optical head (4), a circuit (7) for detecting the reproduced signal by reading the output signal from the optical head (4) based on the reproduction synchronizing signal, and a system controller (10) for determining an optimum phase for a normal reproduction operation by altering the phase of the reproduction synchronizing signal and executing a reproduction operation, the controller (10) being operable to make a phase adjustment for the reproduction synchronizing signal prepared by the delay circuit (12). A normal reproduction operation can be performed at all times by assuring the reproduction synchronizing signal of the optimum phase.

6 Claims, 12 Drawing Sheets

U.S. PATENT DOCUMENTS

| | | | | |
|---|---|---|---|---|
| 5,828,636 | A * | 10/1998 | Matsumoto et al. | 369/44.27 |
| 6,058,093 | A * | 5/2000 | Kato et al. | 369/124.14 |
| 6,072,761 | A * | 6/2000 | Tani | 369/116 |
| 6,101,053 | A * | 8/2000 | Takahashi | 360/46 |
| 6,246,041 | B1 * | 6/2001 | Nakayama et al. | 369/44.25 |
| 6,341,107 | B1 * | 1/2002 | Watanabe | 369/44.29 |
| 6,434,106 | B1 * | 8/2002 | Ohtsuka | 369/116 |
| 6,587,410 | B1 * | 7/2003 | Suzuki et al. | 369/47.28 |
| 6,664,526 | B2 * | 12/2003 | Yokoi | 369/59.19 |
| 7,072,252 | B2 * | 7/2006 | Masaki et al. | 369/44.29 |

FOREIGN PATENT DOCUMENTS

| | | |
|---|---|---|
| JP | 3-119571 | 5/1991 |
| JP | 05-250815 | 9/1993 |
| JP | 5-250815 | 9/1993 |
| JP | 05-258476 | 10/1993 |
| JP | 5-258476 | 10/1993 |
| JP | 08-069638 | 3/1996 |
| JP | 09-063078 | 3/1997 |
| JP | 10-241301 | 9/1998 |
| JP | 2000-057590 | 2/2000 |
| JP | 2000-276743 | 10/2000 |
| JP | 2000-311353 | 11/2000 |

* cited by examiner

DISK REPRODUCTION DEVICE

TECHNICAL FIELD

The present invention relates to disk playback devices for reproducing signals from disks by irradiating the disk with a laser beam from an optical head.

BACKGROUND ART

For use as recording media in disk recording-playback devices adapted to record signals on disks and reproduce signals therefrom, magneto-optical disks have been developed which permit rewriting and have a great memory capacity and high reliability. Such disks have found wide use as external memories in computers and audio visual devices.

Figure 12:
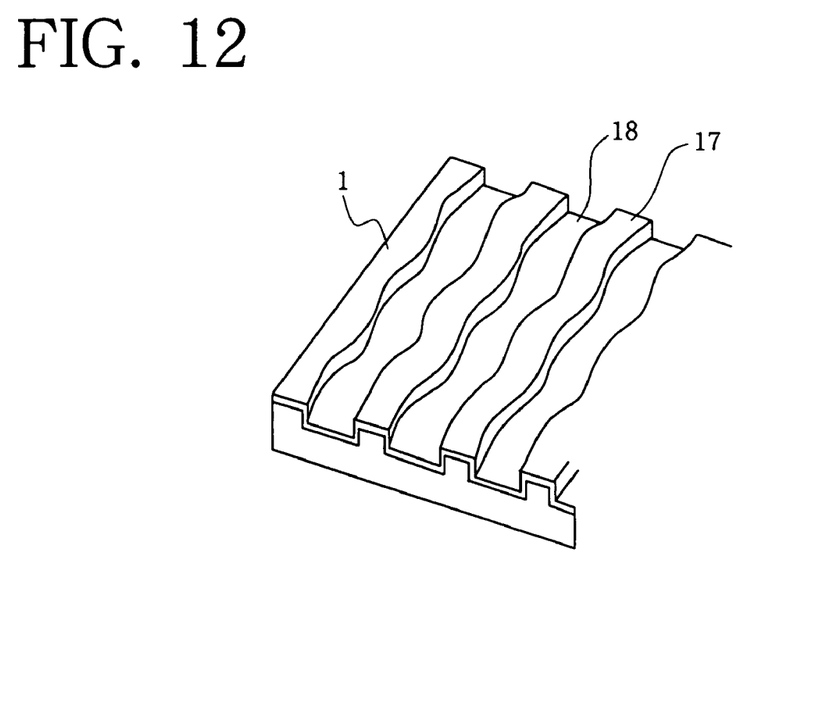
FIG. 12 is a perspective view of lands and grooves formed on a magneto-optical disk.

Developed especially in recent years are techniques for achieving improved recording densities by forming lands 17 and grooves 18 alternately on the signal bearing surface of a magneto-optical disk 1 as shown in FIG. 12 and recording signals on both the land 17 and the groove 18. The lands 17 and the grooves 18 are wobbled as illustrated, and the wobbling frequency is a predetermined center frequency as frequency-modulated. A wobble signal is detected by signal reproduction, and the rotation of the magneto-optical disk is so adjusted that the wobble signal has the center frequency at all times, whereby constant linear velocity control is realized. Various items of information (wobble information) such as address information are contained in the wobble signal which is frequency-modulated as stated above. Various control operations are realized based on the wobble information at the time of signal reproduction.

Figure 6:
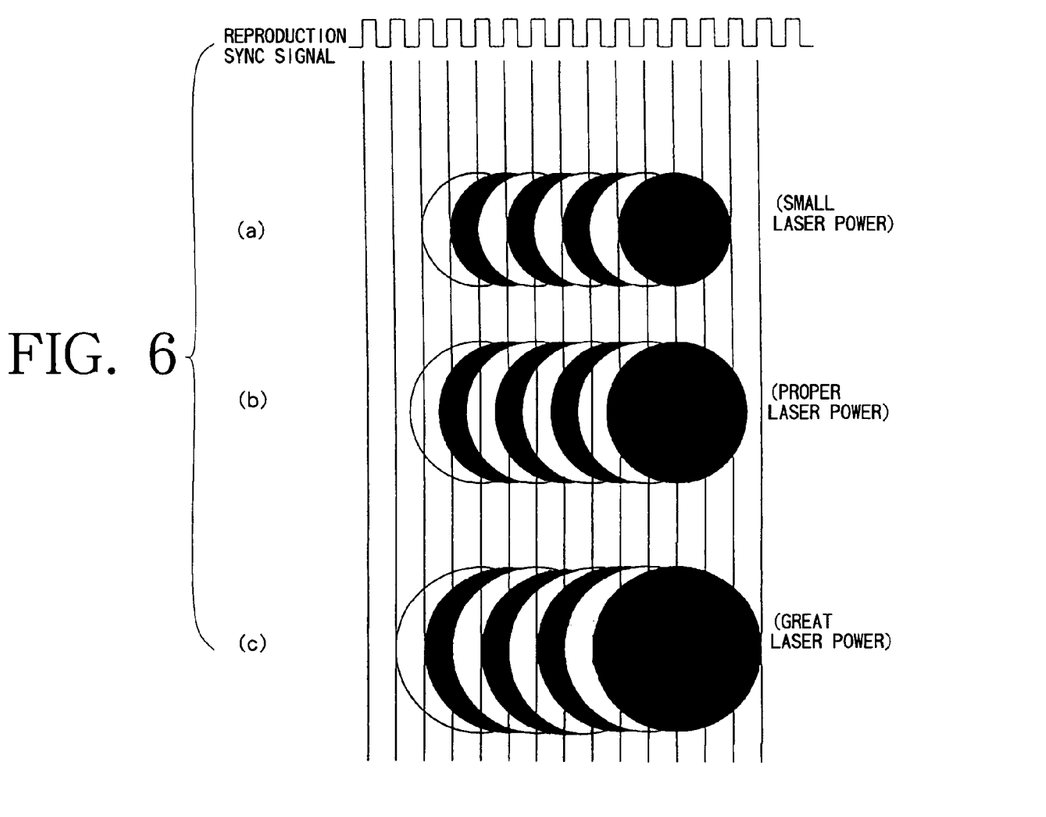
FIG. 6 is a diagram showing the phase relationship between a reproduction synchronizing signal and traces of laser spots.

With the disk recording-playback device for use with such magneto-optical disks serving as recording media, an optical head projects a laser beam onto the disk along the land or groove for signal recording or reproduction, and laser spots are formed on the signal bearing surface of the disk as shown in the form of traces in FIGS. 6(a), (b) and (c). As a result, the recording signal is recorded on the disk in crescent recording areas illustrated. Accordingly, it is desired to read the signal at the position of center of each recording area for signal reproduction. For this purpose, a reproduction synchronizing signal as shown in FIG. 6 is produced so as to read the signal as timed with the synchronizing signal.

The size of laser spots to be formed on the signal bearing surface of the magneto-optical disk is determined according to the magnitude of the laser power and the heat transfer characteristics of the disk. When the spot diameter varies as shown in FIGS. 6(a), (b) and (c), the position of the center of the crescent signal recording area correspondingly shifts as illustrated. Accordingly, even if the reproduction synchronizing signal shown in FIG. 6 has an optimum phase for the arrangement of recording areas shown in FIG. 6(b), the phase of the synchronizing signal will differ from the optimum value for the arrangement of recording areas shown in FIG. 6(a) or (c).

For example with disk recording-playback devices adapted for constant angular velocity control, the inner peripheral side of the disk and the outer peripheral side thereof are different in linear velocity to result in a corresponding difference in optimum laser power, so that the inner peripheral side of the disk and the outer peripheral side thereof differ in the optimum phase of reproduction synchronizing signal. Furthermore, the optimum phase will differ locally, for example, due to local deterioration of the disk. If the phase of the reproduction synchronizing signal is held constant in such a case, the phase will differ from the optimum value.

Figure 13:
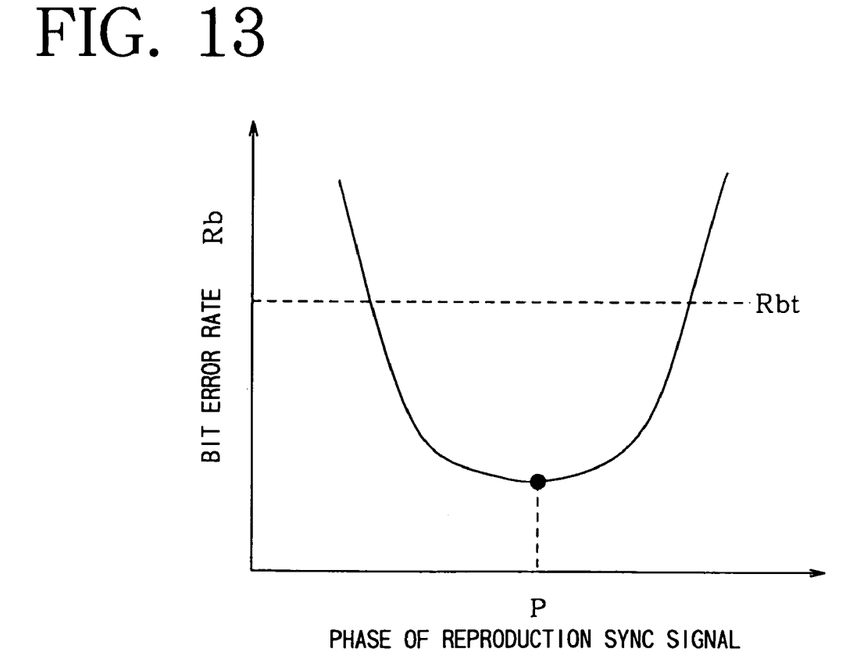
FIG. 13 is a graph showing the relationship between the phase of the reproduction synchronizing signal and the bit error rate.

If the phase of the reproduction synchronizing signal differs from an optimum value P as shown in FIG. 13, the bit error rate of the reproduced signal increases, and difficulty is encountered in performing a normal reproduction operation if the bit error rate exceeds a given threshold value Rbt. No measure has been taken against an increase in bit error rate due to such a difference of the phase of the reproduction synchronizing signal.

Accordingly, a first object of the present invention is to provide a disk playback device which is capable of performing a normal reproduction operation at all times by an optimum phase of the reproduction synchronizing signal.

Further when disk recording-playback devices are in operation for reproducing or recording signals, focusing servo or tracking servo is performed for the actuator incorporated in the optical head, based on a focus error signal or tracking error signal so as to obtain a satisfactory focus state or tracking state. When the disk recording-playback device is initiated into operation, an offset adjustment is made for focusing or tracking to thereby ensure accurate focusing servo and tracking servo for the subsequent signal reproduction or recording operation.

Figure 14:
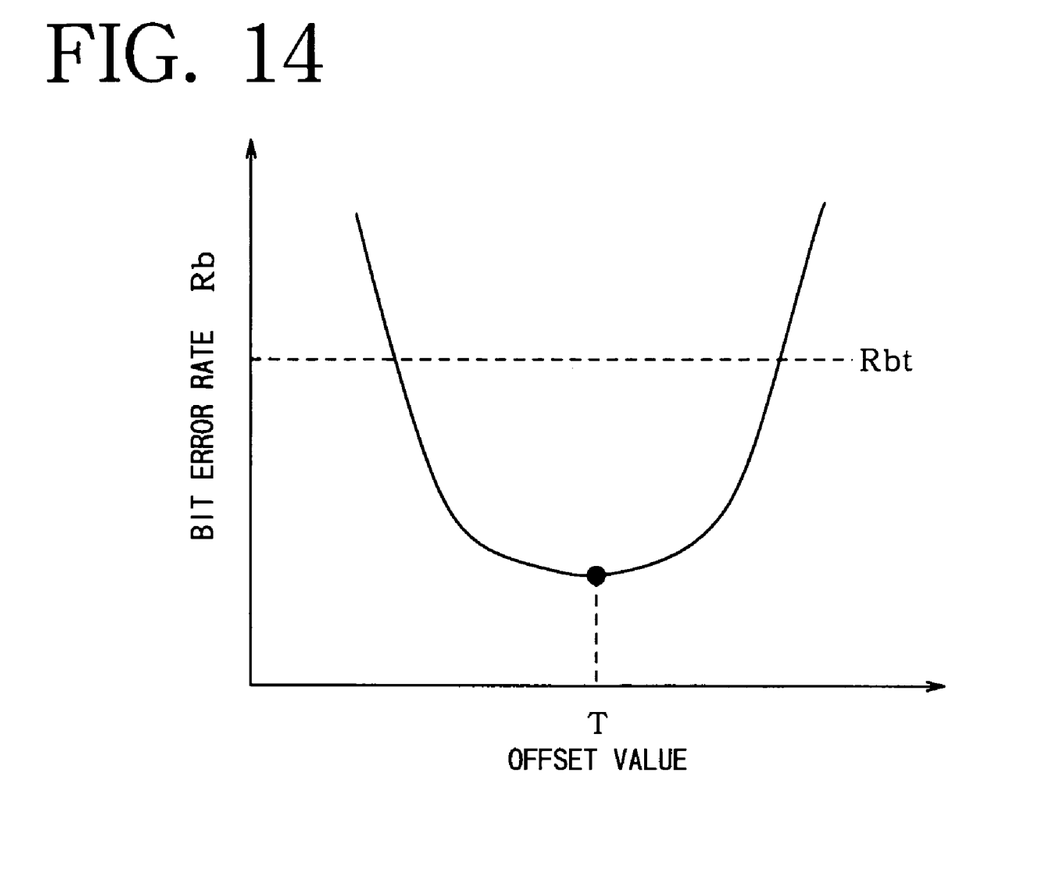
FIG. 14 is a graph showing the relationship between the offset value and the bit error rate in connection with focus errors or tracking errors.

With disk recording-playback devices, however, variations in the ambient temperature leads to the distortion of the housing or parts of the optical head, a shift of position of the optical sensor, variations in the laser wavelength, etc., altering the offset value from an optimum value and consequently impairing the accuracy of focusing servo and tracking servo. If the offset value deviates from the optimum value T greatly as shown in FIG. 14, the bit error rate of reproduced signal exceeds the threshold value Rbt, presenting difficulty in effecting normal reproduction.

Accordingly, a second object of the invention is to provide a disk playback device wherein focusing servo or tracking servo can be performed with high accuracy at all times despite variations in the ambient temperature.

DISCLOSURE OF THE INVENTION

To fulfill the first object, the present invention provides a disk playback device which comprises:

means for producing a reproduction synchronizing signal providing reference timing at which a reproduced signal is detected by reading an output signal from an optical head, means for detecting the reproduced signal by reading the output signal from the optical head based on the reproduction synchronizing signal, means for determining an optimum phase for a normal reproduction operation by altering the phase of the reproduction synchronizing signal and executing a reproduction operation, and phase adjusting means for making a phase adjustment for the reproduction synchronizing signal to be produced by the means for producing a reproduction synchronizing signal based on the optimum phase determined.

With the disk playback device of the invention, an optimum phase is determined for a normal reproduction operation by performing a playback operation for a test track provided on a disk while altering the phase of the reproduction synchronizing signal, or by performing a reproduction operation while altering the phase of the reproduction synchronizing signal when normal reproduction is not performed during a usual signal reproduction operation. The phase of the reproduction synchronizing signal is adjusted based on the optimum phase thus determined. At this time, a phase is searched for which will make the bit error rate of reproduced signal minimum or not greater than a predetermined threshold value and is determined as the optimum phase.

Stated more specifically, the device comprises memory means, the optimum phase determining means determines respective optimum phases at a plurality of physical addresses on the disk, the physical addresses and the optimum phases are stored in the memory means, and the phase adjusting means makes for signal reproduction a phase adjustment which differs for different physical addresses on the disk, based on the optimum phases and the physical addresses stored in the memory means.

In the case where the laser power is made to differ for different physical addresses on the disk, optimum phases are determined for the respective physical addresses, and the phase of the reproduction synchronizing signal is adjusted for each physical address at the time of signal reproduction. This assures normal signal reproduction over the entire signal bearing area of the disk. For example, when an optimum phase is determined for the lands and an optimum phase for the grooves, with the lands and grooves on the disk serving as physical addresses on the disk, signals can be reproduced normally from the respective lands and grooves even when altered optimum laser powers are used for the land and for the groove.

With the reproduction synchronizing signal assured of an optimum phase, the disk playback device of the invention is capable of performing a normal reproduction operation at all times.

To fulfill the second object described above, the present invention provides a disk playback device which comprises:

means for producing an error signal corresponding to a deviation of focusing or tracking of an optical head, control means for controlling the focusing or tracking of the optical head based on the error signal, means for detecting a temperature in the vicinity of the optical head, a calculation processing means for determining an optimum value of offset for the error signal when the variation of the detected temperature is in excess of a predetermined threshold value, and offset adjusting means for making an offset adjustment for the error signal based on the optimum offset value determined, the focusing or tracking of the optical head being controllable based on the offset-adjusted error signal.

With the disk playback device according to the invention, the temperature in the vicinity of the optical head is monitored not only when the device is initiated into operation but also during signal reproduction. Upon a great temperature variation occurring, an optimum offset value is determined for the error signal in corresponding relation with the deviation of the focusing or tracking operation to make an offset adjustment based on the optimum offset value. Consequently reproduced is an error signal which is offset-adjusted optimally in accordance with the temperature, and the focusing or tracking operation of the optical head is accurately controlled based on the error signal.

In determining the optimum offset value, usable is a method wherein an element for detecting the state of signal reproduction, such as the bit error rate of the reproduced signal or the signal level thereof, is detected while actually varying the offset value, and an offset value giving a satisfactory state of signal reproduction is determined as the optimum value.

While the optimum state of signal reproduction is detectable by detecting the signal reproduction state detecting element while gradually varying the offset value and retrieving an optimum point, usable for rapid retrieval is a method comprising detecting the values of signal reproduction state detecting element at at least three points of offset values, approximating these values to a quadratic curve, and determining the center value at the vertex of the quadratic curve as the optimum offset value.

Further with disk playback devices wherein the power of laser beam is controlled, for example, according to variations in temperature, the optimum offset value varies with the magnitude of the laser power, so that signals can be reproduced with higher accuracy by correcting the optimum offset value in corresponding relation with the magnitude of laser power.

With the disk playback device of the invention described above, focusing servo or tracking servo is effected with high accuracy at all times despite variations in the ambient temperature.

BEST MODE OF CARRYING OUT THE INVENTION

With reference to the drawings, a detailed description will be given below of the present invention as embodied into disk recording-playback devices for use with magneto-optical disks serving as recording media.

FIRST EMBODIMENT

Figure 1:
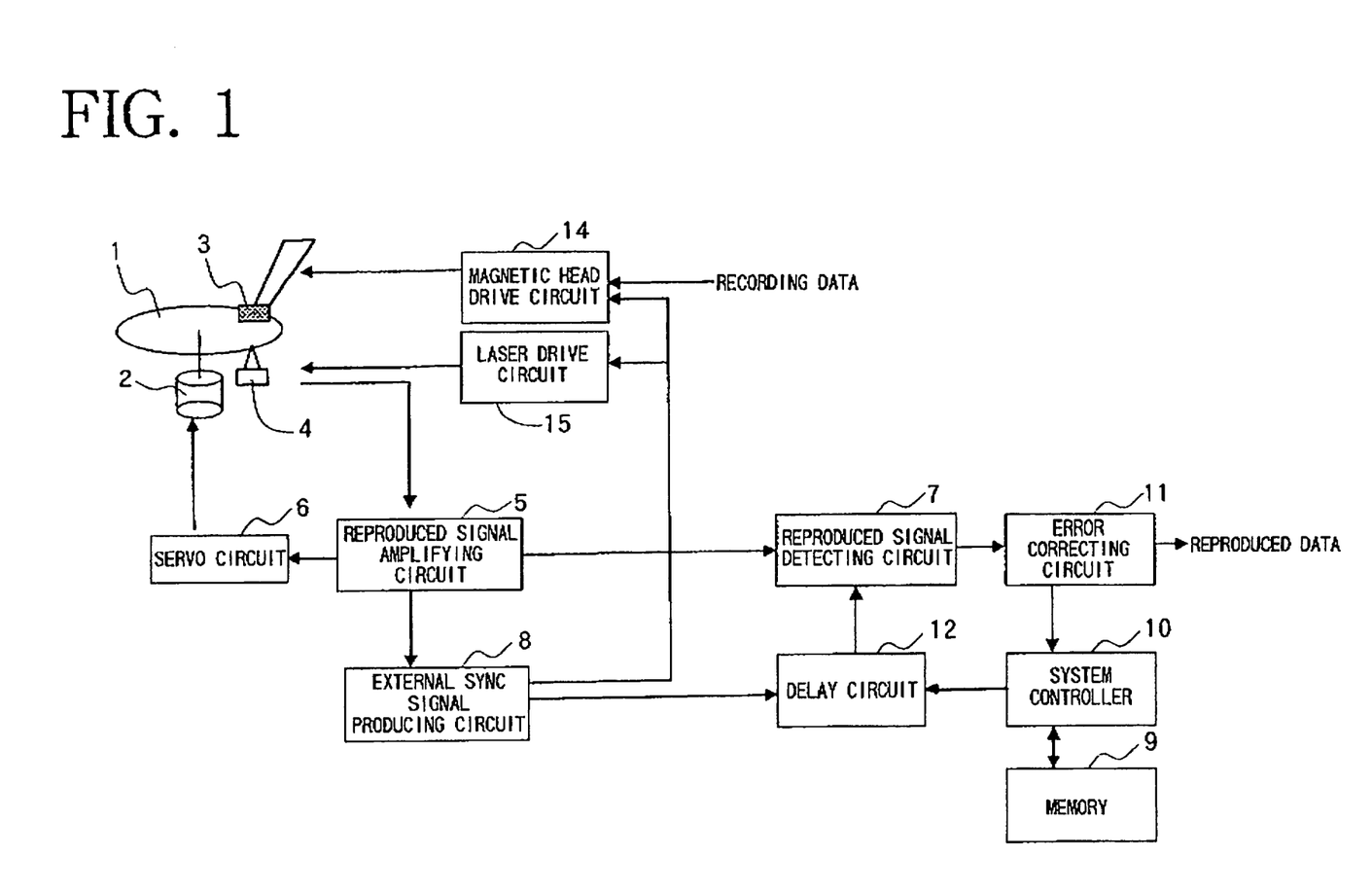
FIG. 1 is a block diagram showing the construction of a disk recording-playback device according to a first embodiment.

FIG. 1 shows a disk recording-playback device embodying the invention and comprising a spindle motor 2 for rotatingly driving a magneto-optical disk 1. The device has a signal reproduction system comprising a laser drive circuit 15, optical head 4, reproduced signal amplifying circuit 5, reproduced signal detecting circuit 7 and error correcting circuit 11. For signal reproduction, the optical head 4 is driven by the laser drive circuit 15 to irradiate the disk 1 with a laser beam. On the other hand, the device has a signal recording system comprising a magnetic head drive circuit 14 and a magnetic head 3. For signal recording, the laser drive circuit 15 and the optical head 4 operate for heating the disk 1 locally. The device further has a control system comprising a servo circuit 6, external synchronizing signal producing circuit 8, system controller 10, memory 9 and delay circuit 12.

The optical head 4 projects a laser beam onto the disk 1, and detects the reflected beam as an optical signal and a magneto-optical signal. The amplifying circuit 5 amplifies the optical signal and magneto-optical signal obtained by the optical head 4 and then feeds a focus error signal and a tracking error signal contained in the optical signal to the servo circuit 6. The amplifying circuit 5 also feeds the optical signal to the external synchronizing signal producing circuit 8 and the magneto-optical signal to the reproduced signal detecting circuit 7.

Figure 5:
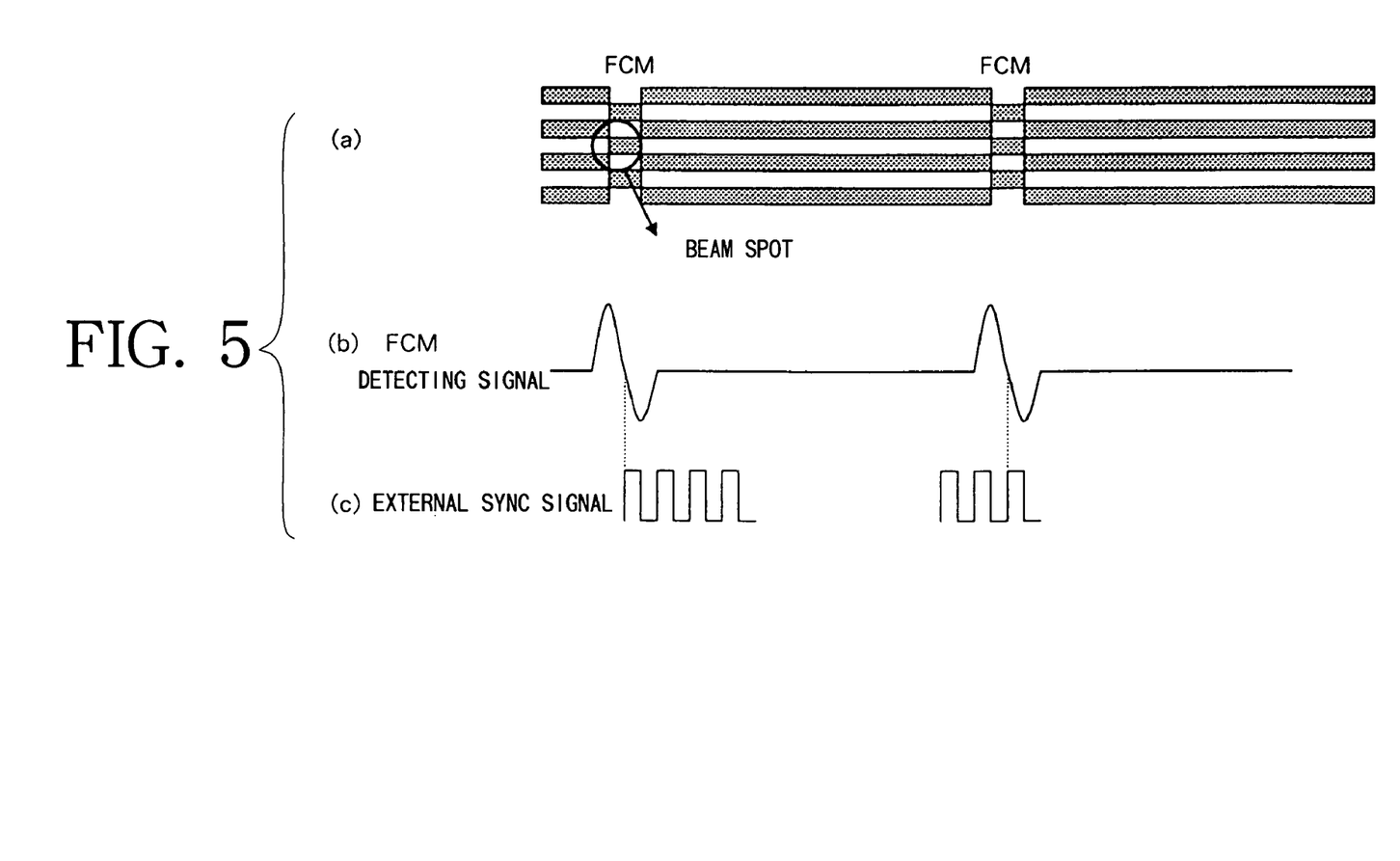
FIG. 5 includes diagrams for illustrating a method of producing an external synchronizing signal.

Based on a signal detecting discrete regions (fine clock marks FCM) provided at a specified interval in the grooves on the magneto-optical disk, the circuit 8 prepares an external synchronizing signal as timed with the detecting signal as shown in FIGS. 5(a), (b), (c).

The circuit 8 delivers the external synchronizing signal to the magnetic head drive circuit 14, laser drive circuit 15 and delay circuit 12 shown in FIG. 1. In response to the focus error signal and tracking error signal, the servo circuit 6 performs focusing servo and tracking servo for an actuator (not shown) provided for the optical head 4, and also controls the rotation of the spindle motor 2.

The delay circuit 12 prepares a reproduction synchronizing signal by delaying the phase of the external synchronizing signal from the circuit 8 by a predetermined time period and feeds the prepared signal to the reproduced signal detecting circuit 7. In response to the reproduction synchronizing signal from the delay circuit 12, the circuit 7 reads an output signal from the amplifying circuit 5 to detect a reproduced signal and feeds the detected reproduced signal to the error correcting circuit 11. The circuit 11 demodulates the reproduced signal, detecting an error of the resulting reproduced data, correcting the error and delivering the reproduced data as corrected to the subsequent circuit.

For signal recording, the magnetic head drive circuit 14 receives the external synchronizing signal from the circuit 8 and the data to be recorded and modulated by a predetermined method and prepares a drive signal for applying an alternating magnetic field to the disk 1. For signal recording and for signal reproduction, the laser drive circuit 15 prepares a drive signal for irradiating the disk 1 with a pulse beam.

In response to the drive signal from the circuit 14, the magnetic head 3 applies an alternating magnetic field to the disk 1. In response to the drive signal from the laser drive circuit 15, the optical head 4 generates a laser beam and projects the beam on the disk 1.

The system controller 10 performs the phase adjusting procedure to be described below to thereby reproduce respective signals from the lands and grooves of test tracks provided in advance on the disk 1, calculates the bit error rates of the lands and the grooves based on the error correction information obtained from the error correcting circuit 11, determines an optimum reproduction phase for the land and an optimum reproduction phase for the groove so as to make the bit error rates the smallest, and stores the results in the memory 9.

Subsequently in the usual signal reproduction operation, the system controller 10 reads the optimum reproduction phase for the land and the optimum reproduction phase for the groove to optimize the phase of the reproduction synchronizing signal for land reproduction and groove reproduction.

Figure 2:
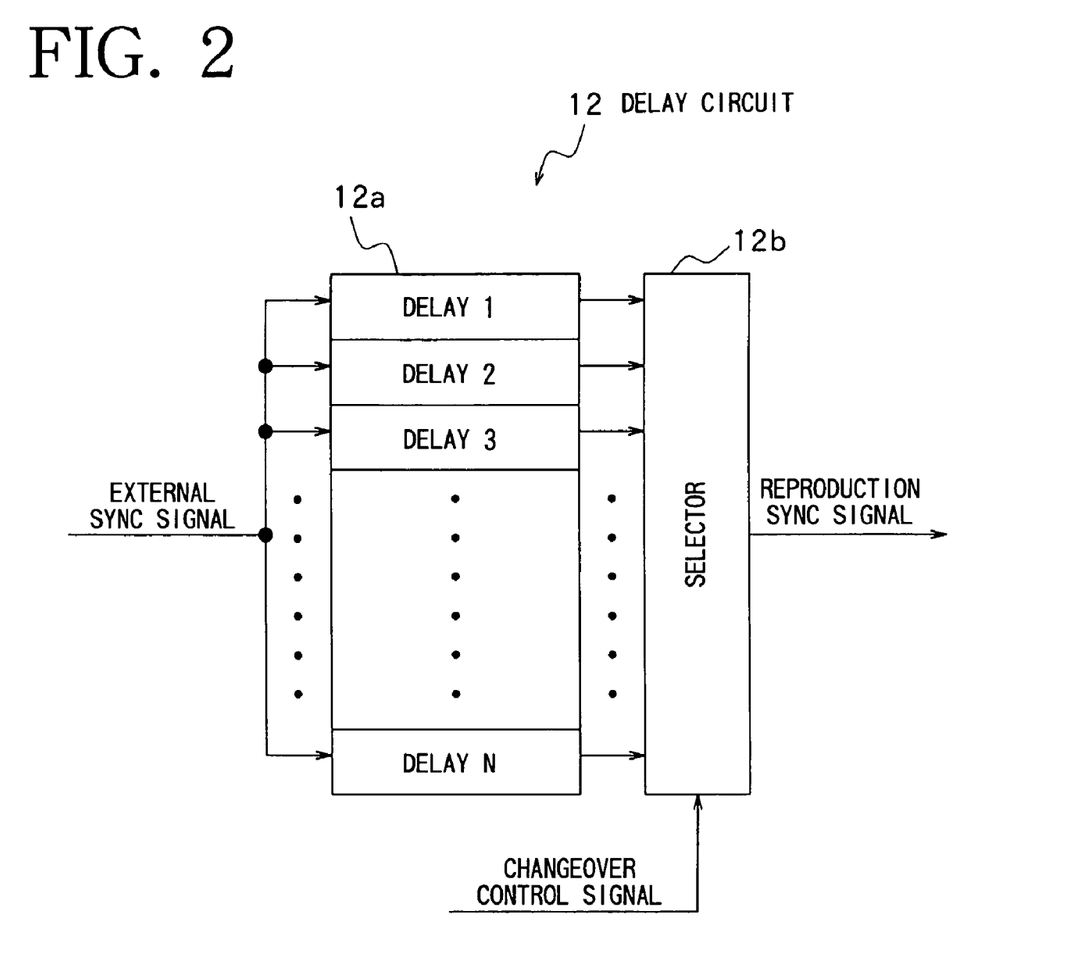
FIG. 2 is a block diagram showing in detail the construction of a delay circuit.

FIG. 2 shows the construction of the delay circuit 12 employed in the present embodiment. The circuit has a plurality of delay elements 12a which are different in delay time for processing the external synchronizing signal for delaying by different periods of time. A selector 12b is switched to select one of the delay elements 12a for the adjustment of the phase of the reproduction synchronizing signal. The selector 12b can be switched by a changeover control signal from the system controller 10.

Figure 3:
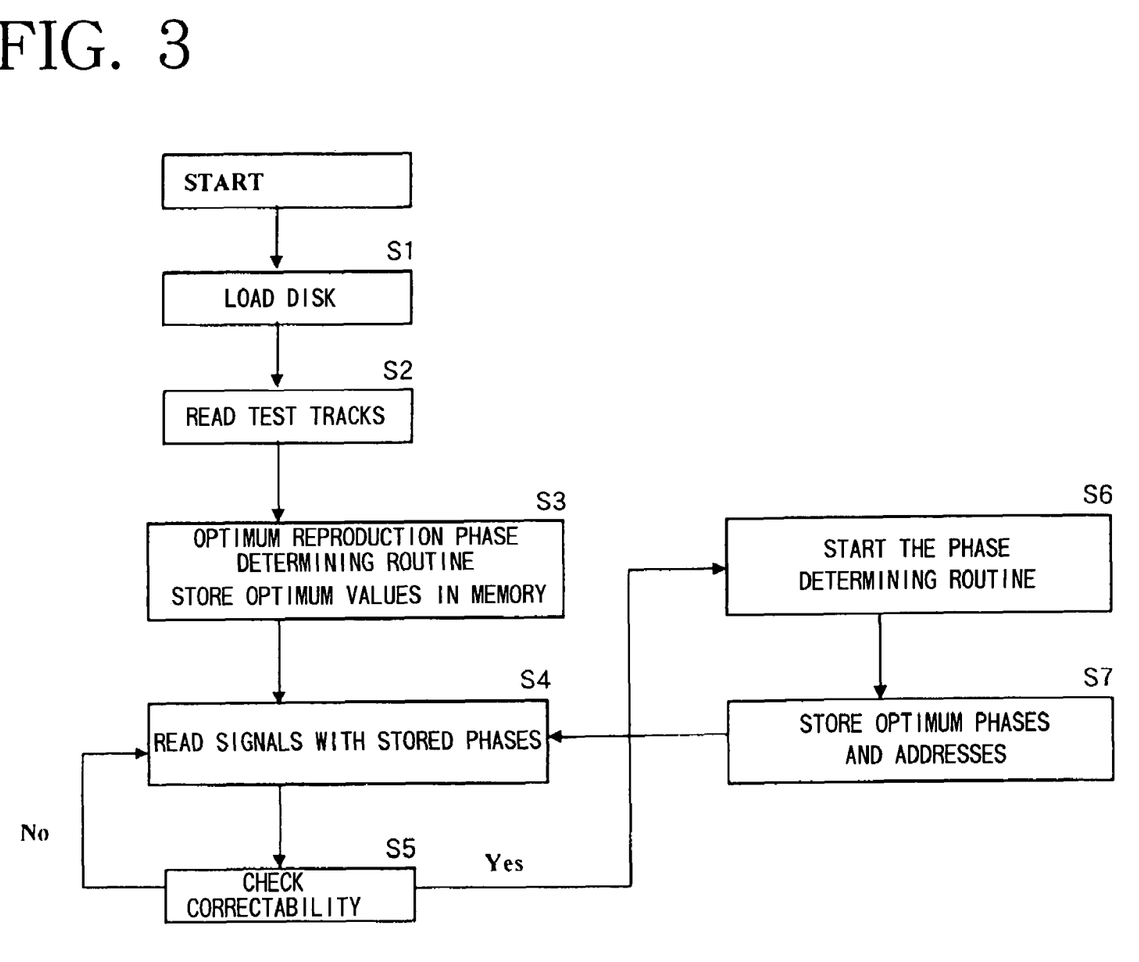
FIG. 3 is a flow chart showing a reproduction phase adjusting procedure for use in the device.

FIG. 3 shows the reproduction phase adjusting procedure to be performed by the system controller 10. A magneto-optical disk is first brought to the signal recording-playback position in step S1, and signals are reproduced (read) in step S2 from lands and grooves of test tracks provided on the disk in advance.

Next, a routine (to be described below) for determining optimum reproduction phases is executed, and the optimum values obtained of reproduction phases for the land and the groove are stored in the memory in step S3. The optimum values of reproduction phases stored in the memory are thereafter read in step S4 to perform a usual signal production operation with the optimum reproduction phases. The signal is reproduced from lands with the optimum reproduction phase for the land, and the signal is reproduced from the groove with the optimum reproduction phase for the groove.

Step S5 inquires whether it is impossible to correct errors of the reproduced data, and if the answer is negative, step S4 follows again to continue the signal reproduction operation. On the other hand, if error correction of the reproduced data is impossible and when the inquiry of step S5 is answered in the affirmative, the sequence proceeds to step S6 to execute a routine (to be described below) for determining optimum reproduction phases, followed by step S7, in which the optimum reproduction phases are stored in the memory along with addresses. Step S4 then follows again to reproduce signals with the optimum reproduction phases. The subsequent reproduction operation is performed with the optimum reproduction phases stored in the memory at the corresponding addresses where such phases are stored. Incidentally, the reproduction phase adjusting procedure during the reproduction operation can be performed utilizing free time available during data processing for signal reproduction.

Figure 4:
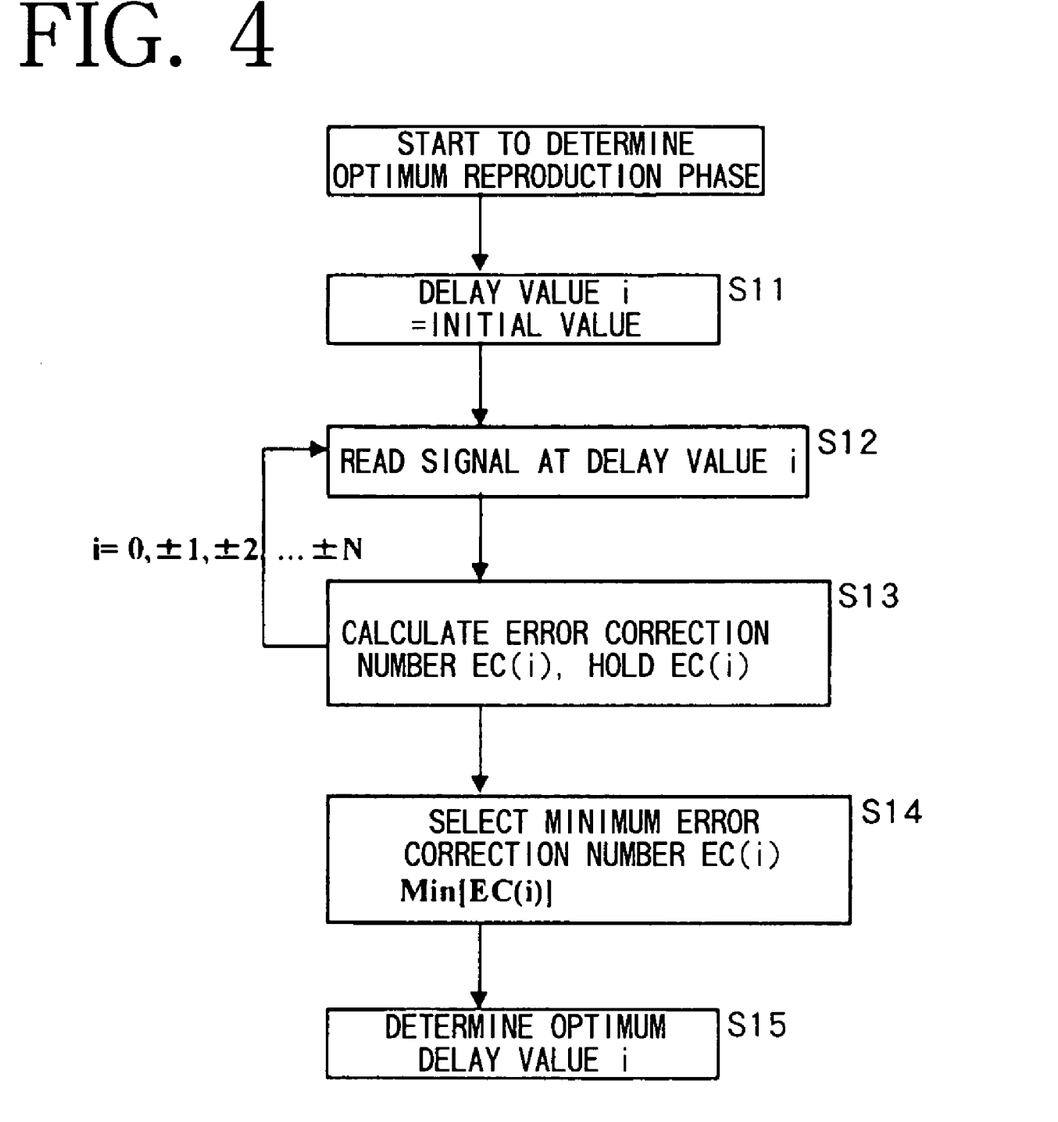
FIG. 4 is a flow chart showing an optimum reproduction phase determining procedure.

FIG. 4 shows a procedure for determining an optimum reproduction phase. The number (delay value i) of delay element of the delay circuit 12 is set at an initial value first in step S11, and the delay element of that delay value i is selected to read the signal to be reproduced in step S12.

Subsequently in step S13, an error correction number EC(i) of the reproduced data is calculated, and the result is held. The delay value i is increased or decreased, followed by step S12 again to reproduce a signal at the delay value i concerned.

Consequently, all the delay elements are selected, and error correction numbers EC(i) of all the delay values i are calculated, whereupon step S14 follows to select the smallest of all the error correction numbers EC(i). The delay value which realizes this minimum error correction number is determined as an optimum delay value i, i.e., as an optimum reproduction phase.

The disk playback device of the invention described is adapted not only to initiate a signal reproduction operation with an optimum phase for each of the land and the groove on the magneto-optical disk but also to detect an optimum reproduction phase as to an address where signal reproduction becomes abnormal locally during the reproduction operation so as to subsequently conduct a normal signal reproduction operation.

An address which specifies, for example, a zone or area on the disk is alternatively usable as the physical address to be stored along with the optimum reproduction phase.

SECOND EMBODIMENT

Figure 7:
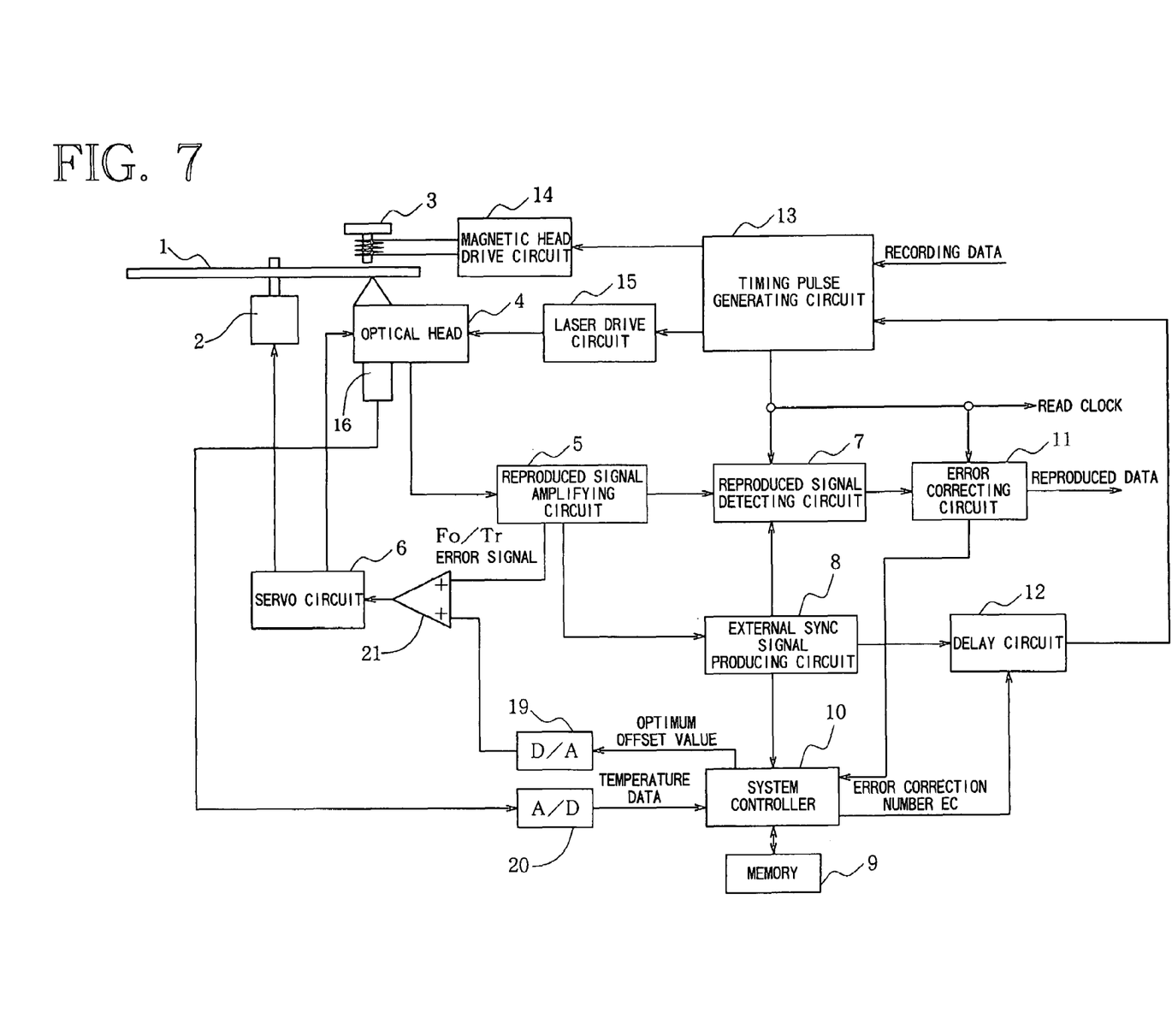
FIG. 7 is a block diagram showing the construction of a disk recording-playback device according to a second embodiment.

FIG. 7 shows another disk recording-playback device embodying the present invention and comprising a spindle motor 2 for rotatingly driving a magneto-optical disk 1. The device has a signal reproduction system comprising a laser drive circuit 15, optical head 4, reproduced signal amplifying circuit 5, reproduced signal detecting circuit 7 and error correcting circuit 11. For signal reproduction, the optical head 4 is driven by the laser drive circuit 15 to irradiate the disk 1 with a laser beam. On the other hand, the device has a signal recording system comprising a magnetic head drive circuit 14 and a magnetic head 3. For signal recording, the laser drive circuit 15 and the optical head 4 operate for heating the disk 1 locally.

The device further has a control system comprising a temperature sensor 16, A/D converter 20, system controller 10, memory 9, D/A converter 19, adder 21, servo circuit 6, external synchronizing signal producing circuit 8, delay circuit 12 and timing pulse generating circuit 13.

The optical head 4 projects a laser beam onto the disk 1, and detects the reflected beam as an optical signal and magneto-optical signal. The amplifying circuit 5 amplifies the optical signal and magneto-optical signal obtained by the optical head 4 and then feeds a focus error signal and tracking error signal contained in the optical signal to the servo circuit 6. The amplifying circuit 5 also feeds an optical signal, which is detected due to discrete regions provided at a constant interval in the grooves of the disk 1, to the external synchronizing signal producing circuit 8 and the magneto-optical signal to the reproduced signal detecting circuit 7.

The circuit 8 produces an external synchronizing signal and feeds the signal to the system controller 10, reproduced signal detecting circuit 7 and delay circuit 12. In response to the focus error signal and tracking error signal, the servo circuit 6 executes focusing servo and tracking servo for an actuator (not shown) provided for the optical head 4, and also controls the rotation of the spindle motor 2 based on the external synchronizing signal.

The reproduced signal detecting circuit 7 feeds the detected reproduced signal to the error correcting circuit 11. The circuit 11 demodulates the reproduced signal, detects errors from the reproduced signal thus obtained, corrects the errors, and outputs the reproduced data as corrected to the subsequent circuit. The delay circuit 12 prepares a synchronizing signal by delaying the phase of the external synchronizing signal by a predetermined time period and feeds the signal to the timing pulse generating circuit 13.

For signal recording, the timing pulse generating circuit 13 receives the data to be recorded and modulated by a specified method and the synchronizing signal from the delay circuit 12, prepares a pulse signal for applying an alternating magnetic field to the disk 1, feeds the signal to the magnetic head drive circuit 14, also prepares a pulse signal (write clock) for irradiating the disk 1 with a pulse beam and feeds the signal to the laser drive circuit 15. For signal reproduction, the timing pulse generating circuit 13 further produces a pulse signal (read clock) for irradiating the disk 1 with a pulse beam based on the synchronizing signal from the delay circuit 12 and feeds the signal to the laser drive circuit 15, reproduced signal detecting circuit 7 and error correcting circuit 11.

The magnetic head drive circuit 14 prepares a drive signal for the magnetic head 3 based on the pulse signal from the timing pulse generating circuit 13. The magnetic head 3 applies an alternating magnetic field based on the drive signal from the head drive circuit 14.

The laser drive circuit 15 drives a semiconductor laser (not shown) provided on the optical head 4 based on the pulse signal from the timing pulse generating circuit 13. The optical head 4 produces a laser beam based on the drive signal from the laser drive circuit 15 and irradiates the disk 1 with the beam.

An output signal from the temperature sensor 16 is converted by the A/D converter 20 to temperature data, which is then fed to the system controller 10.

Based on the external synchronizing signal obtained from the signal producing circuit 8, the system controller 10 controls the operation of the delay circuit 12. Based on an error correction number EC obtained from the error correcting circuit 11 and the temperature data obtained from the A/D converter 20, the system controller 10 performs the offset adjusting procedure to be described later to determine optimum offset values for the focus error signal and the tracking error signal, and delivers the optimum offset values to the D/A converter 19.

The optimum offset signals obtained from the D/A converter 19 for the focus error signal and the tracking error signal are fed to the adder 21 and added respectively to the focus error signal and the tracking error signal from the reproduced signal amplifying circuit 5, whereby both the signals are offset-adjusted. The resulting focus error signal and tracking error signal are input to the servo circuit 6 for focusing servo and tracking servo operations.

Figure 8:
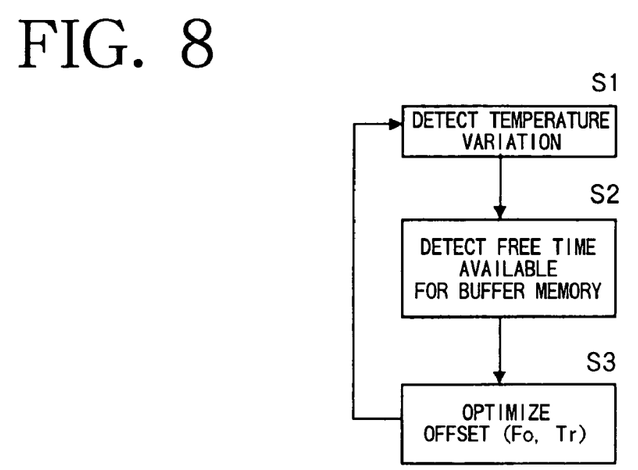
FIG. 8 is a flow chart showing the overall flow of an offset adjusting procedure for the device.

FIG. 8 shows the main flow of the offset adjusting procedure to be performed by the system controller 10 during signal reproduction. When occurrence of a temperature variation in excess of a predetermined value is detected first in step S1, free time available during data processing with use of a buffer in the memory is detected in step S2, whereupon step S3 follows to repeat a procedure for optimizing the offset values for the focus error signal Fo and tracking error signal Tr.

Figure 9:
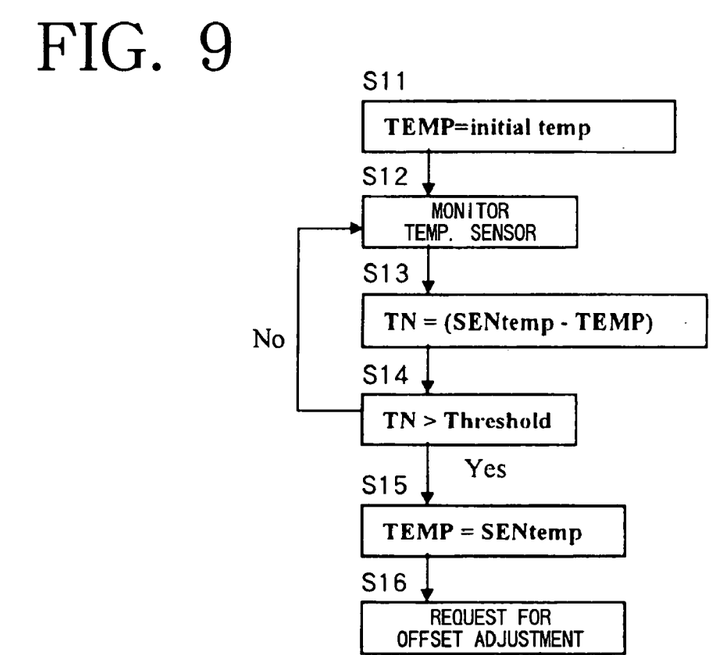
FIG. 9 is a flow chart showing in detail a temperature variation detecting procedure included in the offset adjusting procedure.

FIG. 9 shows the details of step S1. First in step S11, an initial value is written to temperature data TEMP indicating the temperature immediately before the start of the procedure, and the output of the temperature sensor is monitored in step S12 to obtain temperature data SENtemp indicating the current temperature. The preceding temperature data TEMP is then subtracted from the current temperature data SENtemp in step S13 to calculate the temperature difference TN. An inquiry is thereafter made in step S14 as to whether the temperature difference TN is in excess of a predetermined threshold value Threshold. If the inquiry is answered in the negative, step S12 follows again to monitor the temperature sensor.

On the other hand, if the inquiry of step S14 is answered in the affirmative since the temperature difference TN is in excess of the value Threshold, step S15 follows to substitute the current temperature data SENtemp for the preceding temperature data TEMP. A request for an offset adjustment is thereafter made in step S16.

Figure 11:
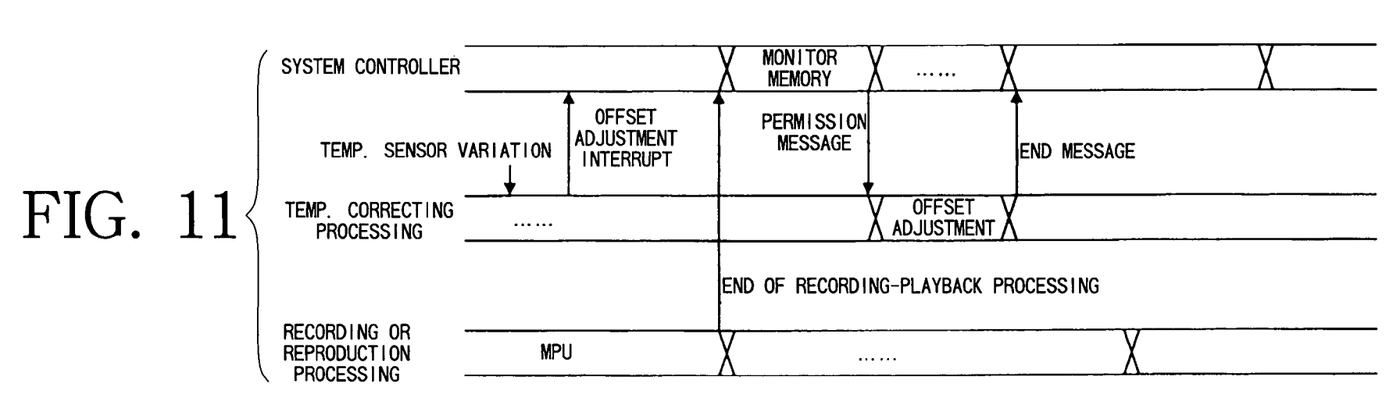
FIG. 11 is a time chart for illustrating the flow of process to be executed by a system controller.

When an interrupt request is made for executing an offset adjustment as stated above, the system controller 10 monitors the memory upon completion of an instance of recording or reproduction processing by MPU as shown in FIG. 11, and gives a message permitting an offset adjustment upon recognizing a vacant space available in the buffer. For example, the offset adjusting permitting message is produced upon recognizing that the recording data buffer is nearly vacant if the device is in operation for recording or that the reproduction data buffer is nearly full if the device is in operation for reproduction.

Figure 10:
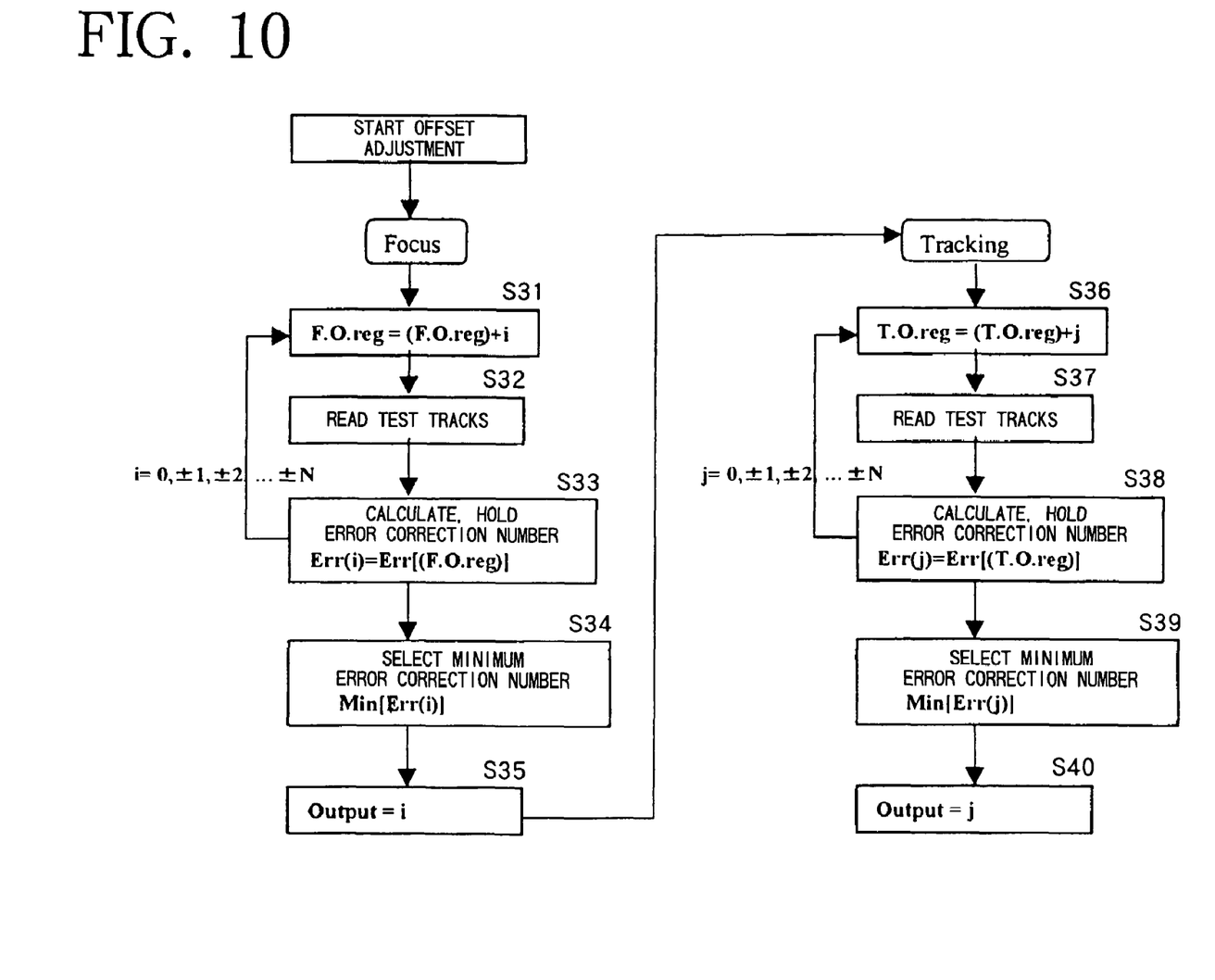
FIG. 10 is a flow chart showing in detail an offset optimizing procedure included in the offset adjusting procedure.

In response to the permission message, the specific offset adjustment procedure shown in FIG. 10 is performed. For the offset adjustment for focus errors, an offset value F.O.reg is altered by a predetermined value i (i=0, ±1, ±2, . . . ±N) in step S31, signals are thereafter reproduced (read) in step S32 from the test tracks provided on the disk in advance, calculates the error correction number Err[(F.O.reg)] of the reproduced data at the offset value F.O.reg concerned and holds the result as error correction number Err(i) in step S33. The predetermined value i is then increased or decreased, followed by step S31 again in which the offset value F.O.reg is altered by a predetermined value i, and the test track is read.

As a result, the test tracks are read at all offset values F.O.reg, and the error correction numbers Err(i) for the reproduced data is held, whereupon the smallest error correction number Min[Err(i)] is selected in step S34. In step S35, the variation i of offset value realizing this minimum error correction number is given as an output value Output. In this way, an optimum offset value is determined for the focus error.

Subsequently for the offset adjustment for tracking errors, an offset value T.O.reg is altered by a predetermined value j (j=0, ±1, ±2, . . . ±N) in step S36, signals are thereafter reproduced (read) in step S37 from the test tracks provided on the disk in advance, calculates the error correction number Err[(T.O.reg)] of the reproduced data at the offset value T.O.reg concerned and holds the result as error correction number Err(j) in step S38. The predetermined value j is then increased or decreased, followed by step S36 again in which the offset value T.O.reg is altered by a predetermined value j, and the test track is read.

As a result, the test tracks are read at all offset values T.O.reg, and the error correction numbers Err(j) for the reproduced data are held, whereupon the smallest error correction number Min[Err(j)] is selected in step S39. In step S40, the variation j of offset value realizing this minimum error correction number is given as an output value Output. In this way, an optimum offset value is determined for the tracking error.

The optimum offset values for the focus error and the tracking error are delivered to the D/A converter 19 shown in FIG. 7, followed by addition processing by the adder 21 for the offset adjustment of the focus error signal and the tracking error signal. Consequently, a focus error signal and a tracking error signal which are always appropriate are prepared by the servo circuit 6 in spite of the temperature variations in the vicinity of the optical head 4 to realize focusing servo and tracking servo with high accuracy.

Offset adjustment can be made similarly for focus errors and tracking errors at the time of signal recording. An optimum offset value is determined first by the offset adjusting procedure described, and this value is multiplied by the ratio Pw/Pr of the laser power Pw for signal reproduction to the laser power Pr for signal recording, whereby the optimum offset value for signal recording can be determined.

The device of the present invention is not limited to the foregoing embodiments in construction but can be modified variously within the technical scope set forth in the appended claims. For example, the adjustment in accordance with the ambient temperature of the optical head is not only useful for offset values to correct the focus error and tracking error but also for the adjustment of gains (servo gains) of the servo circuit.

Further with disk recording-playback devices wherein the laser power is altered, for example, in accordance with the temperature of the magneto-optical disk, optimum offset or servo gain is corrected according to the variations of the laser power, whereby a servo operation can be realized with high accuracy at all times regardless of the laser power. The gain is in inverse proportion to the power, and the offset is in proportion to the power. Suppose the result of offset adjustment is Offset_ref, the result of gain adjustment is Gain_ref, and the reproduction power for adjustment is Pr_ref. The optimum servo gain Gain and the optimum offset Offset when the laser power is altered from Pr_ref to Pr or Pw can be calculated from the following equations.

The Pw at this time is an optically effective value. The following equations are useful in the case of so-called DC irradiation recording as when the disk is always irradiated with a laser beam, whereas in the case of pulse irradiation recording wherein the laser is caused to emit a beam with pulses, the effective value Pw is to be converted in accordance with the rate of irradiating pulses for use in the equations.

(1) Offset correction (for reproduction)

Offset=Offset_ref×Pr/Pr_ref (2) Offset correction (for recording)

Offset=Offset_ref×Pw/Pr_ref (3) Gain correction (for reproduction)

Gain=Gain_ref×Pr_ref/Pr (4) Gain correction (for recording)

Gain=Gain_ref×Pr_ref/Pw

The invention claimed is:

1. A disk playback device wherein a disk is irradiated with a laser beam from an optical head to reproduce signals from the disk, the disk playback device being characterized in that the device comprises:

means for producing a reproduction synchronizing signal providing reference timing at which a reproduced signal is detected by reading an output signal from the optical head, means for detecting the reproduced signal by reading the output signal from the optical head based on the reproduction synchronizing signal, means for determining an optimum phase for a normal reproduction operation by altering the phase of the reproduction synchronizing signal and executing a reproduction operation, and phase adjusting means for making a phase adjustment for the reproduction synchronizing signal to be produced by the means for producing a reproduction synchronizing signal based on the optimum phase determined, wherein the optimum phase determining means retrieves as the optimum phase a phase which makes the bit error rate of the reproduced signal minimum not greater than a predetermined threshold value, wherein the phase adjusting means permits a delay time to be changeable to thereby make a phase adjustment for reproduction synchronizing signal based on the determined optimum phase.

2. A disk playback device according to claim 1 which comprises memory means and wherein the optimum phase determining means determines optimum phases respectively at a plurality of physical addresses on the disk, and the physical addresses and the optimum phases are stored in the memory means, the phase adjusting means being operable to make for signal reproduction a phase adjustment which differs for different physical addresses on the disk, based on the optimum phases and the physical addresses stored in the memory means.

3. A disk playback device according to claim 1 wherein the optimum phase determining means retrieves as the optimum phase a phase which makes the bit error rate of the reproduced signal minimum.

4. A disk playback device according to claim 1 wherein the optimum phase determining means determines the optimum phase for a normal reproduction operation by performing a playback operation for a test track provided in advance on the disk while altering the phase of the reproduction synchronizing signal.

5. A disk playback device according to claim 1 wherein the optimum phase determining means determines the optimum phase for a normal reproduction operation by performing a playback operation while altering the phase of the reproduction synchronizing signal when normal reproduction is not performed during a usual signal reproduction operation.

6. A disk playback device according to claim 1 wherein the optimum phase determining means determines the optimum phase for each of a land and a groove which are formed on the disk.

* * * * *